United States Patent [19]

VanHorn

[11] Patent Number: 4,948,068

[45] Date of Patent: Aug. 14, 1990

[54] CIRCULATION CONTROL SLOTS IN HELICOPTER YAW CONTROL SYSTEM

[75] Inventor: James R. VanHorn, Scottsdale, Ariz.

[73] Assignee: McDonnell Douglas Corporation, Long Beach, Calif.

[21] Appl. No.: 193,018

[22] Filed: May 12, 1988

[51] Int. Cl.$^5$ .............................................. B64C 27/82
[52] U.S. Cl. .................................................. 244/17.19
[58] Field of Search ...................... 244/199, 207, 17.19, 244/130; 239/552, 553, 553.5, 559, 567, 568

[56] References Cited

U.S. PATENT DOCUMENTS 3,525,486  8/1970  Wimpenny ........................... 244/199
4,200,252  4/1980  Logan et al. ...................... 244/17.19

FOREIGN PATENT DOCUMENTS 850918  9/1952  France ................................. 244/199

Primary Examiner—Joseph F. Peters, Jr.
Assistant Examiner—Anne Sartelle
Attorney, Agent, or Firm—Paul T. Loef; George W. Finch; John P. Scholl

[57] ABSTRACT

In a NOTAR TM (No tail rotor) system for a helicopter, the addition of vortex generators in the longitudinal slots or nozzles which produce the circulation control portion of the system which combines with a jet thruster and fluid resource to replace the tail rotor.

9 Claims, 2 Drawing Sheets

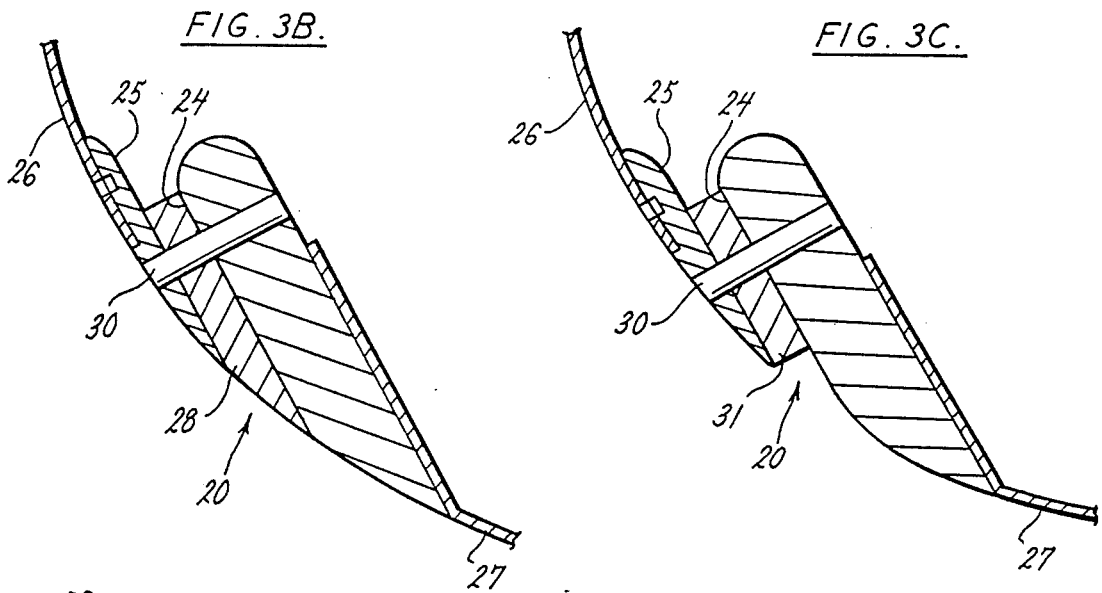
FIG. 3B.
FIG. 3C.
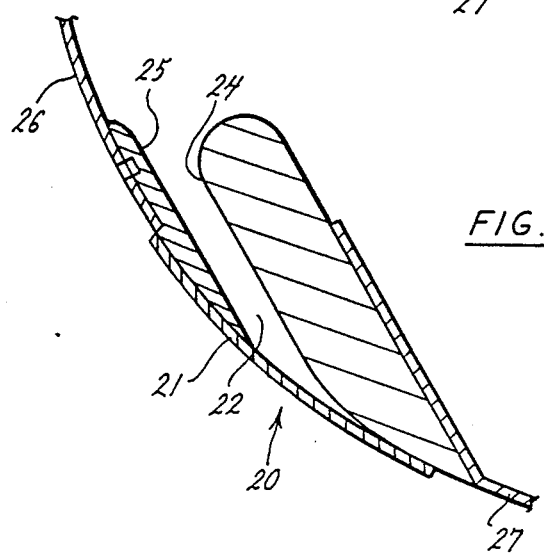
FIG. 3A.
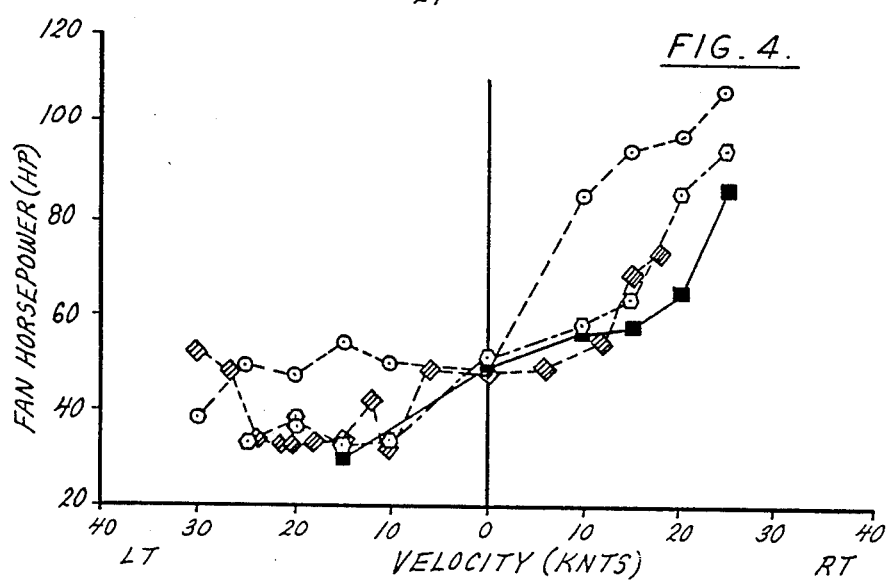
FIG. 4.

CIRCULATION CONTROL SLOTS IN HELICOPTER YAW CONTROL SYSTEM

BACKGROUND OF THE INVENTION

The invention pertains to helicopters, and more particularly to the improved performance of the circulation control slot portion of an anti yaw system, which replaces the conventional tail rotor system.

Tail rotors have been the almost exclusive means for providing yaw control in helicopters as well as overcoming the biasing torque produced by the main rotor. However, tail rotors contribute to over 15% of all helicopter accidents, largely through tail rotor strikes. The tail rotor also dominates the helicopter's acoustical signature and contributes substantially to the pilot's work load.

A substitute anti-torque and yaw control system employing a combination of a circulation-control tail boom and a jet thruster in place of the tail rotor is taught in U.S. Pat. No. 4,200,252, Logan et al, and owned by the same assignee as the instant case. In this system low pressure air, provided by a variable pitch axial flow fan mounted in the helicopter fuselage, is ejected from thin horizontal slots in the right side of the tail boom. The jets produced by this air flow follow the contour of the tail boom and induce the main rotor wake to do the same. This action produces lift on the tail boom, like any other airfoil, in the direction required to counteract the torque produced by the main rotor. The force produced by the circulation control tail boom is supplemented by the force produced by the jet thruster, which also produces all the yaw maneuvering forces. The proportion of the force produced by each of these two elements of the invention depends upon the mode of flight of the helicopter. In high-speed translational flight, the main rotor wake trails the tail boom and as a result, the tail boom produces essentially no force and all the force is produced by the jet thruster. When the helicopter is in the hover mode, the circulation control on the tail boom provides approximately 60% of the anti-torque force required, while the jet thruster produces the balance. The circulation control tail boom produces a force with relatively low power consumption compared to the jet thruster and power is provided by the engine which also drives the main rotor. Hence it is important for the circulation control tail boom to be as effective as possible. This is particularly true when the helicopter is flying in a hover mode or experiencing low translational flight velocities avoiding the increased power required by the jet thrusters until the aircraft has passed through translational lift. At this point the main rotor power required is decreasing as the fan power required to drive the thrusters is increasing and the "NOTAR" ™ does not limit the aircraft performance with respect to payload.

"NOTAR" is an acronym for "No Tail Rotor" and is a trademark of McDonnell Douglas describing the anti-torque and yaw control system above, which replaces the conventional tail rotor.

It is an object of this invention to improve the performance of the circulation control tail boom when the helicopter is in the hover mode or traveling at low translational velocities.

SUMMARY OF THE INVENTION

In summary, the invention provides a NOTAR system using a combination of a circulation-control tail boom, a jet thruster, and a fluid source. The jet thruster is capable of directing air to either side of the tail boom in various amounts so as to provide a variable side force on the boom. A variable-pitch axial flow fan is mounted in the helicopter fuselage to provide a source of fluid for both the circulation control and jet thruster. The invention further provides for the addition of vortex generators located in the longitudinal slots or nozzles in spaced relationship with each other and the ends of the nozzles so as to produce higher energy locally at the vortex generator.

A thin layer of laminar flow produced from the longitudinal slot, exists adjacent to the surface of the boom followed by a boundary layer of sluggish, viscous fluid of lower energy, and finally the free stream fluid flow or main rotor down wash. The generated vortices co-act with the boundary layer and the free stream fluid flow by mixing its high energy flow with the slower-moving boundary layer air flow so as to delay separation and enhance the circulation control about the tail boom.

BRIEF DESCRIPTION OF THE DRAWINGS

FIGS. 3A, B, and C are cross-sectional views of alternate embodiments of the vortex generators of this invention in relationship to the longitudinal nozzles; and FIG. 4 shows Fan Horsepower Required versus Helicopter Velocity in Sideward Flight for a fully open slot, different spacing on vortex generators and the open slot with fences at the ends.

DESCRIPTION OF THE PREFERRED EMBODIMENT

Figure 1:
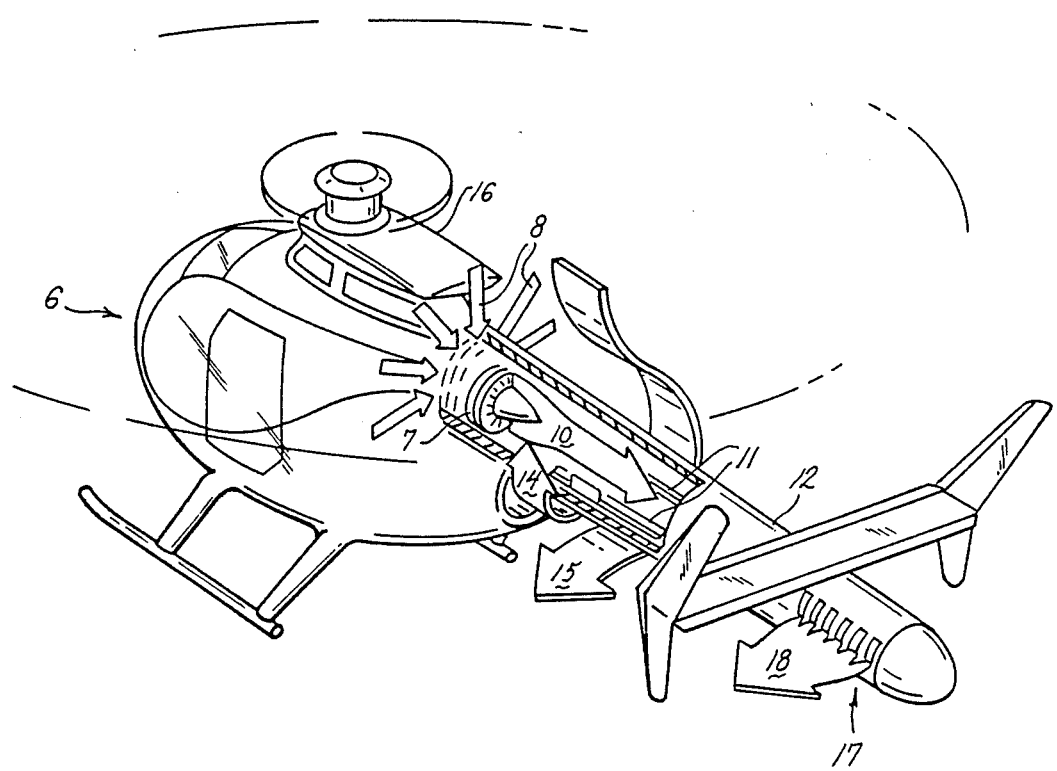
FIG. 1 is a perspective view of the helicopter with a portion of the fuselage and tail boom skin removed so as to functionally show the parts of the NOTAR system of this invention.

FIG. 1 shows a helicopter in a pictorial presentation of the NOTAR system of this invention and the function of each element in the system. Located in the fuselage portion of the helicopter 6 is a variable-pitch, axial flow fan 7, which takes in air represented by the arrows 8. The fan produces an axial output air flow shown by the arrow 10, which feeds the longitudinal nozzles 11. Low-pressure air is ejected from the too thin horizontal nozzles or slots 11 on the right side of the tail boom 12. The nozzles 11 produce a jet or thin sheet of air represented by the arrow 14, which follows the contour of the tail boom 12 and induces the main-rotor wake, represented by the arrow 15, to also follow the contour of the tail boom. The attachment of the main rotor wake 15 produces lift on the tail boom 13 in the direction required to counteract the torque of the main rotor 16. The circulation control system provides approximately 60% of the anti-torque force required while the helicopter is in a hover mode.

The jet thruster 17, whose air outlet is represented by the arrow 18, provides the balance of the anti-torque force required at hover and all yaw maneuvering forces. This jet thruster 17, although not shown in detail here, is a sleeve valve assembly formed by two concentric truncated cones. The inner cone is fixed and has openings to direct air either right or left. The outer cone rotates and has a constant area cutout. The rotation of the outer cone varies the jet's exit area to satisfy the requirements for both thrust magnitude and direction. The thrust exit area is coordinated with the pitch of the blades of the fan 7 so as to maintain a constant pressure in the tail boom. Both mechanisms are controlled by the pilot's yaw-control pedals, which are rigged to behave as in a conventional helicopter. Further details of the NOTAR system are shown in U.S. Pat. No. 4,200,252; incorporated herein by reference.

Figure 2:
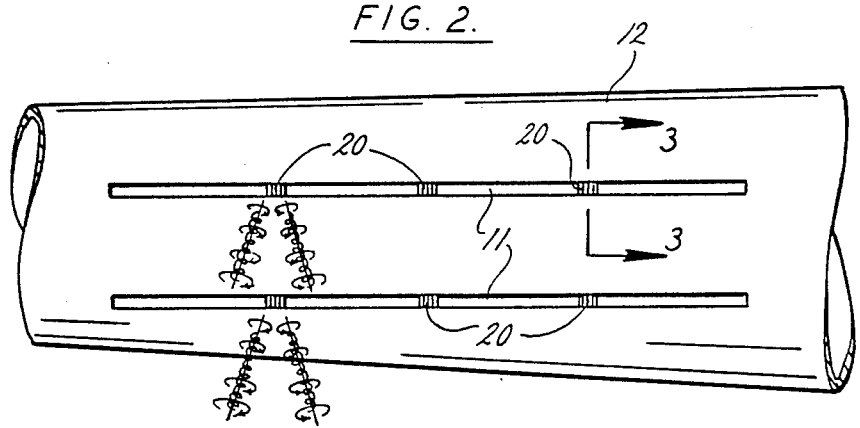
FIG. 2 is an enlarged view of a portion of the tail boom showing two longitudinal nozzles or slots which produce the circulation control portion of the system and the effects of the vortex generators in the nozzles.

This invention is directed toward improving the performance of the longitudinal slots or nozzles 11 by the addition of vortex generators 20. Each vortex generator produces a pair of trailing vortex filaments, in cross section, having adjacent counter-rotating vortices as shown in FIG. 2. These vortices pump energy into the viscous fluid flow of the boundary layer which exists just outside of the jet or sheet of air produced by the horizontal nozzle 11. The generated vortices co-act with the boundary layer so as to induce the free stream, produced by the main rotor, to delay separating from the surface of the tail boom and thereby produce lift on the tail boom.

Some alternate embodiments of the vortex generator of this invention are shown in FIGS. 3A, B, and C. The preferred embodiment is shown in FIG. 3A, and consists of a thin strap 21, which bridges the opening in the nozzle 22, which is formed by the inboard and outboard portions of the nozzle, 24 and 25, respectively. The outboard and inboard portions of the longitudinal nozzle are shown attached to the upper skin 26 and the lower skin 27 of the tail boom. The preferred embodiment of FIG. 3A is a fiber reinforced tape approximately 1/16 of an inch thick and 1 inch wide, spaced approximately 14 ¼ inches apart in a 60 inch nozzle.

FIG. 3B shows an alternate embodiment of the vortex generator 20 which consists of a spacer 28, which is faired at the outboard edge to match the overall contour of the tail boom 12. Faired spacer 28 is maintained in lace by the fastener shown at 30.

FIG. 3C is yet another alternative embodiment wherein the squared spacer 31 is terminated perpendicular to the nozzle surface.

FIG. 4 shows the performance of several alternate configurations of the longitudinal slot or nozzle. The curve indicated by the points with a dot and circle represents a fully open slot without any vortex generators and requires the maximum fan power in right sideward flight. The dot with the hexagonal enclosure represents a slot with two vortex generators as shown in FIG. 3A. The solid square is the same vortex generator except that there were three in a 60 inch slot and shows the lowest fan power requirement in right sideward flight. Finally, the shaded diamond is the fully opened slot with aerodynamic fences at either end of the slot, like collars, to avoid interfering flow from the fuselage. This configuration, i.e. the fences, indicates how well the boom flies without interference from the fuselage and is more or less a guide of potential performance of the nozzles. It is not a practical solution because of the high drag produced by the fences. The power curves show that the tail boom is still effectively flying at 20 knots in right sideward flight. This means that the increase in power when the tail boom no longer provides the lift in the sideward direction does not occur until after the helicopter has passed through translational lift; therefore, main rotor power required is decreasing as the fan power required is increasing. Hence, the NOTAR of this invention does not limit the aircraft performance with respect to payload.

It should now be reasonably clear that the vortex generators of this invention enhance the performance of the longitudinal slots or nozzles, as illustrated in the curves of FIG. 4. It should be noted that various changes and modifications may be made in the aerodynamic design and construction of the vortex generating elements without departing from the scope of this invention.

What is claimed is:

1. An anti-torque and yaw control system for a helicopter having a tail boom generally oriented perpendicular to the down wash of the helicopter main rotor when in the hovering mode, comprising:
    at least one linear nozzle having an opening extending longitudinally in said tail boom and disposed to discharge a jet of fluid tangentially to the surface of said tail boom so as to produce a thin layer of fluid flow;
    at least one means to produce at least one vortex intermediate the ends of said jet discharge from said at least one linear nozzle so as to intercept said fluid flow at said at least one vortex;
    a jet thruster located in the distal end of said tail boom and capable of directing fluid to opposite sides of said tail boom so as to produce variable side forces on said tail boom; and
    means to supply fluid to both said at least one linear nozzle and said jet thruster.

2. The anti-torque and yaw control system of claim 1 wherein said at least one means to produce said at least one vortex is a thin and narrow strap bridging said opening in said linear nozzle spaced from said end of said linear nozzle.

3. The anti-torque and yaw control system of claim 1 wherein said at least one means to produce said at least one vortex is a spacer located within said opening and terminating essentially flush and faired with said opening.

4. The anti-torque and yaw control system of claim 1 wherein said at least one means to produce said at least one vortex is a spacer located within said opening and terminating at the outlet end essentially perpendicular and flush with said nozzle opening.

5. The anti-torque and yaw control system of claim 2 wherein said at least one means to produce at least one vortex is a series of straps spaced between ten and eighteen inches apart.

6. The anti-torque and yaw control system of claim 1, wherein each of said means to produce said at least one vortex produces two closely spaced counter-rotating vortices.

7. A boundary layer control system for an aerodynamic surface exposed to external air flow comprising:
    at least one longitudinal slot having an opening in said aerodynamic surface, said opening oriented generally transverse to the general direction of said external air flow and disposed to discharge fluid flow fluid tangentially to said aerodynamic surface; and
    at least one means to produce at least one vortex located intermediate the ends of said slot.

8. The boundary layer control system of claim 7, wherein said at least one means to produce at least one vortex produces two closely spaced counter rotating vortices.

9. An anti-torque and yaw control system for a helicopter having a tail boom generally oriented perpendicular to the down wash of the helicopter main rotor when in the hovering mode, comprising:

at least one linear nozzle having an opening extending longitudinally in said tail boom and disposed to discharge a jet of fluid tangentially to the surface of said tail boom so as to produce a thin layer of fluid flow;

a series of straps bridging said opening in said linear nozzle spaced between ten and eighteen inches apart so as to produce vortices;

a jet thruster located in the distal end of said tail boom and capable of directing fluid to opposite sides of said tail boom so as to produce variable side forces on said tail boom; and means to supply fluid to both said at least one linear nozzle and said jet thruster.

* * * * *